US 6,557,451 B2

(12) United States Patent
Schlüter

(10) Patent No.: US 6,557,451 B2
(45) Date of Patent: May 6, 2003

(54) VACUUM BRAKE BOOSTER WITH MAGNET-FREE EMERGENCY BREAKING ASSISTANCE SYSTEM

(75) Inventor: Peter Schlüter, Kammerforst (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/846,934

(22) Filed: May 1, 2001

(65) Prior Publication Data
US 2001/0027717 A1 Oct. 11, 2001

Related U.S. Application Data

(63) Continuation of application No. PCT/EP99/08203, filed on Oct. 28, 1999.

(30) Foreign Application Priority Data
Nov. 2, 1998 (DE) .......................... 198 50 478

(51) Int. Cl.[7] ................................................. F15B 9/10
(52) U.S. Cl. ................................................. 91/376 K
(58) Field of Search ..................................... 91/376 R

(56) References Cited

U.S. PATENT DOCUMENTS 4,630,706 A * 12/1986 Takayama et al. ............. 60/534
5,493,946 A     2/1996  Schluter
5,611,257 A *  3/1997  Eick ............................. 91/367
5,711,202 A *  1/1998  Tsubouchi ..................... 91/367
5,845,556 A * 12/1998  Tsubouchi et al. ............. 91/367

FOREIGN PATENT DOCUMENTS

DE     4405092 C1    12/1994
DE     4441913 A1     5/1996
JP     9-175373       7/1997

* cited by examiner

Primary Examiner—F. Daniel Lopez
(74) Attorney, Agent, or Firm—MacMillan, Sobanski & Todd, LLC

(57) ABSTRACT

A vacuum brake booster comprising a vacuum chamber (16) and a working chamber (18), separated by a movable wall (14) coupled to a housing (22). A control valve (20) includes a first valve seat (40) formed on a displacement valve member (38) and cooperating with a first valve seat member (42), to control a supply of atmospheric pressure to the working chamber. A rear side of the valve member is constantly subjected to pressure in the working chamber. When the valve member is displaced more than a predetermined distance in the actuating direction relative to the housing, a front side of the valve member is subjected to pressure in the vacuum chamber, such that a differential pressure acts on the valve member, to hold the valve member in a displaced position until pressure equalization between the first and rear sides of the valve member is effected.

9 Claims, 4 Drawing Sheets

VACUUM BRAKE BOOSTER WITH MAGNET-FREE EMERGENCY BREAKING ASSISTANCE SYSTEM

CROSS REFERENCE TO RELATED APPLICATIONS

This application is a continuation of International Application No. PCT/EP99/08203 filed Oct. 28, 1999, which claims priority to German Patent Application No. 19850478.0 filed Nov. 2, 1998.

BACKGROUND OF THE INVENTION

The invention relates to vacuum brake boosters with a vacuum chamber and a working chamber, which is separated in a pressure-tight manner from the latter by a moveable wall, and a control valve, which comprises a housing coupled in a working manner to the moveable wall and a first valve seat, which is disposed in the housing and which, interacting with a first valve sealing member, can control the supply of at least atmospheric pressure to the working chamber in accordance with the displacement of an input member, which is coupled to the first valve seat, of the brake booster in order to obtain a pressure difference at the moveable wall. Vacuum brake boosters of this kind have been known for a long time and are used in a vast number of cases to boost the actuating forces of a hydraulic vehicle brake system and thereby maintain them at a low level which is acceptable to the driver of a vehicle.

So-called brake assistants are also known. This term is usually understood to mean a system which can make increased braking power available to a driver with substantially the same actuating force in an emergency braking situation. Systems of this kind were developed because tests revealed that, although when emergency braking most vehicle users depress the brake pedal quickly, they do not do so forcefully enough to achieve the maximum possible braking power. The stopping distance of the vehicle is therefore longer than necessary. Systems of this kind which are already in production use a brake booster which can be electromagnetically actuated together with a device which can determine the actuating speed of the brake pedal. If this device detects an actuating speed lying above a predetermined threshold value, it is assumed that an emergency braking situation exists and the brake booster is fully driven by means of the electromagnetic actuating device, i.e. it provides its maximum boost power. A brake booster with an electromagnetically actuated brake assistant of this kind is known from DE 44 05 092 C1.

However brake boosters with an electromagnetic actuation facility are too expensive for motor vehicles of the lower and middle price category. Solutions which achieve a brake assistant function at less expense are therefore required.

SUMMARY OF THE INVENTION

The object of the invention is to provide a vacuum brake booster of the above-mentioned type with a brake assistant function without having to resort to a control valve which can be electromagnetically actuated. Unintentional initiation of the brake assistant function is at the same time to be prevented as far as possible.

Valve member which is coupled to the input member in the actuating direction of the brake booster. According to the invention the displaceable valve member is always subjected to the pressure prevailing in the working chamber at its rear side, which faces the input member. If, however, the displaceable valve member is displaced relative to the control valve housing in the actuating direction by more than a prefixed distance, then the displaceable valve member is subjected over at least a part of its front side, which lies opposite the rear side, to the pressure prevailing in the vacuum chamber, and the pressure difference then acting on the displaceable valve member holds the valve member in the position which is reached until pressure equalisation between the front side and the rear side of the displaceable valve member takes place.

This means that, according to the invention, the pressure difference prevailing at the moveable wall at the time is used to exert a force acting on the displaceable valve member in the actuating direction in order to hold the first valve seat formed at the displaceable valve member completely open in certain situations in which the actuating force exerted by the driver is not sufficient for this, so that the brake booster builds up the greatest possible pressure difference between its vacuum chamber and its working chamber, i.e. provides its maximum boost power.

After exceeding the above-mentioned, prefixed relative displacement, the displaceable valve member of the vacuum brake booster according to the invention is therefore virtually "sucked" into a position in which the first valve seat is completely open. However this necessary relative displacement is only achieved when the actuating speed of the input member exceeds a defined value. In the vacuum brake booster according to the invention the brake assistant function is therefore activated solely by the skilful utilisation of pressure differences present within the brake booster. No magnet is required to initiate the brake assistant function.

In the vacuum brake booster according to the invention the brake assistant function is disengaged by means of a reduction in the pressure difference acting on the displaceable valve member. The reduction in this pressure difference is initiated by a return movement of the input member which exceeds a certain measure.

In preferred embodiments of the vacuum brake booster according to the invention the displaceable valve member is resiliently biased opposite to the actuating direction of the brake booster. This resilient biasing advantageously ensures that the displaceable valve member is coupled to the input member in the actuating direction of the brake booster and on the other hand enables the displaceable valve member to be uncoupled from the input member when the brake assistant function is activated. In embodiments of this kind the force acting on the displaceable valve member on account of the pressure difference must be greater than the opposing spring force acting on the valve member in order to initiate the brake assistant function. This requirement can easily be taken into account by appropriately dimensioning the surfaces of the valve member which are subjected to the pressure difference.

A second valve seat is preferably formed at the displaceable valve member in the vacuum brake booster according to the invention, which seat co-operates with a second valve sealing member which in turn co-operates with a third valve seat which establishes a connection between the working chamber and the vacuum chamber in the open state. After the valve member has exceeded the prefixed displacement relative to the control valve housing, the second valve seat is closed and the third valve seat open, so that the pressure prevailing in the vacuum chamber can now act on the displaceable valve member.

In particularly preferred embodiments the second valve seat is formed at the front side of the displaceable valve member. An annular cavity is defined between the second valve seat and the third valve seat, both of which are preferably annular, the end boundary of which cavity is formed on one side by the displaceable valve member. The third valve seat is in particular disposed concentrically with and radially outside of the second valve seat. The annular cavity is connected to the vacuum chamber when the second valve seat is closed and the third valve seat open, while it is connected to the working chamber when the second valve seat is open and the third valve seat closed. The surface of the displaceable valve member which is located radially between the second valve seat and the third valve seat can thus be subjected either to the pressure in the vacuum chamber or the pressure in the working chamber.

According to one embodiment of the vacuum brake booster according to the invention, in order to be able to reduce a pressure difference acting on the displaceable valve member, the latter comprises a duct which connects the front side of the valve member to its rear side. This duct, which is normally closed, may be opened by displacing the input member or a component coupled to the latter, this displacement taking place relative to the displaceable valve member opposite to the actuating direction of the brake booster and exceeding a prefixed measure. The prefixed measure ensures that the brake assistant function is not unintentionally disconnected too soon.

According to a preferred configuration of the brake booster according to the invention, the duct connecting the front side to the rear side of the displaceable valve member can be closed by means of a ring seal comprising two axially spaced, circulating sealing lips. The ring seal is accommodated in a component which is guided on or in the displaceable valve member and can be displaced relative to the valve member. The axial spacing of the two circulating sealing lips in this case substantially determines the extent of the relative displacement between the component and the valve member which is necessary to open the duct and initiate pressure equalisation.

In preferred embodiments of the brake booster according to the invention the second valve sealing member is resiliently biased opposite to the actuating direction of the brake booster and can be axially displaced against this spring biasing. The extent of the axial displaceability of the second valve sealing member in this case represents the switching threshold which must be overridden in order to initiate the brake assistant function. In embodiments of this kind the force resulting from the pressure difference at the displaceable valve member must be greater than the sum of the spring forces which act in the opposite direction and which bias the second valve sealing member or displaceable valve member, respectively, in order to initiate the brake assistant function.

The displaceable valve member is preferably substantially sleeve-shaped in order to achieve a space-saving construction. The first valve seat is in this case formed at the end of the valve member which faces the input member, while the second valve seat is located at the opposite end of the valve member. A sleeve-shaped, displaceable valve member of this kind can be integrated into conventional control valve constructions without noticeably affecting the diameter or overall length thereof.

The input member is preferably also resiliently biased opposite to the actuating direction in all embodiments of the vacuum brake booster according to the invention. When the brake is released this resilient biasing returns the input member to the initial position. This resilient biasing of the input member is used to advantage in constructional terms during its return movement to the initial position to move back the above-mentioned component in which the ring seal is accommodated relative to the displaceable valve member in order thus to open the duct provided in the valve member and disconnect the brake assistant function.

DETAILED DESCRIPTION OF THE INVENTION

Figure 1:
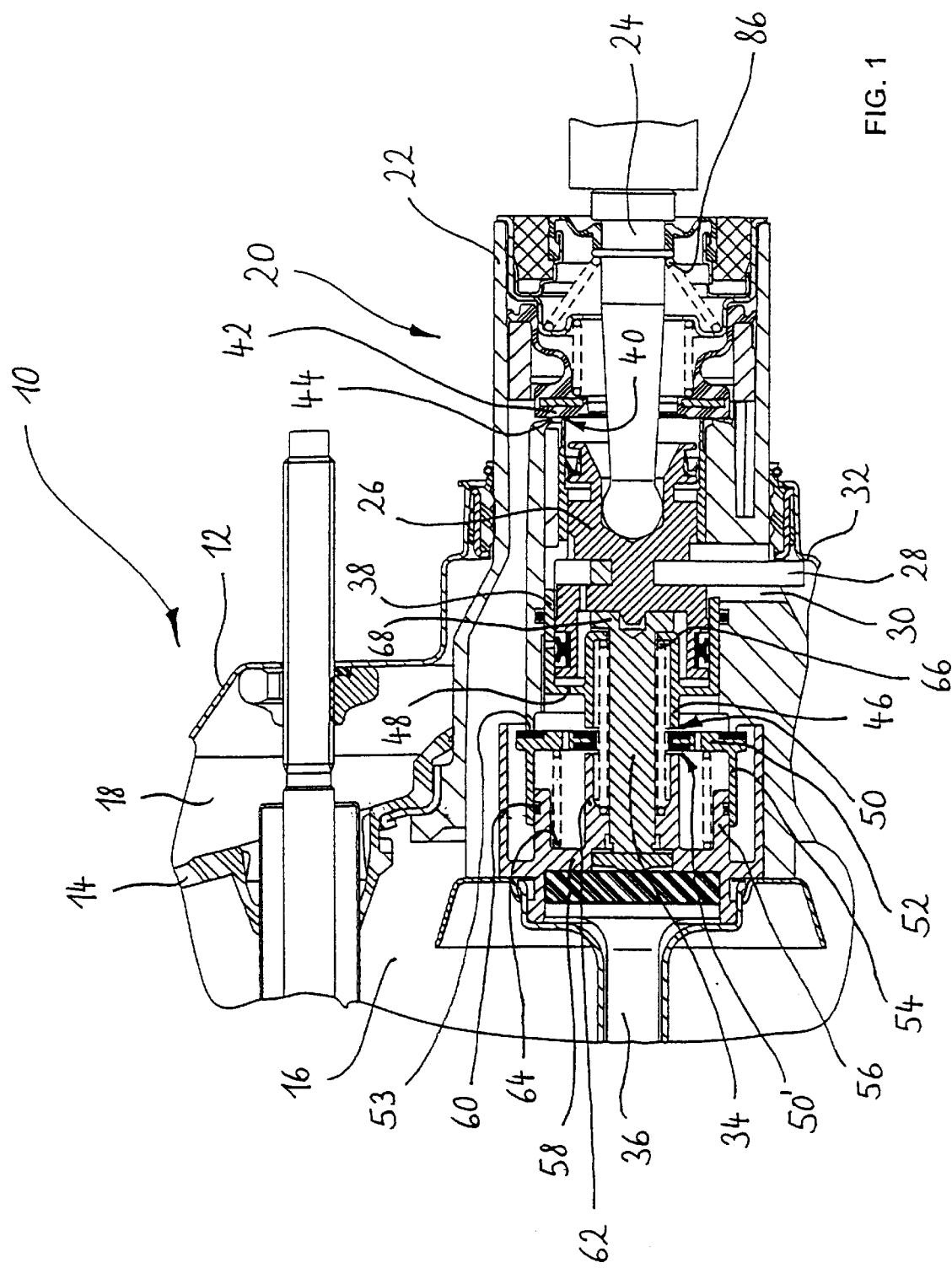
FIG. 1 is a longitudinal section through the region concerned of a vacuum brake booster according to the invention in a rest position.
Figure 2:
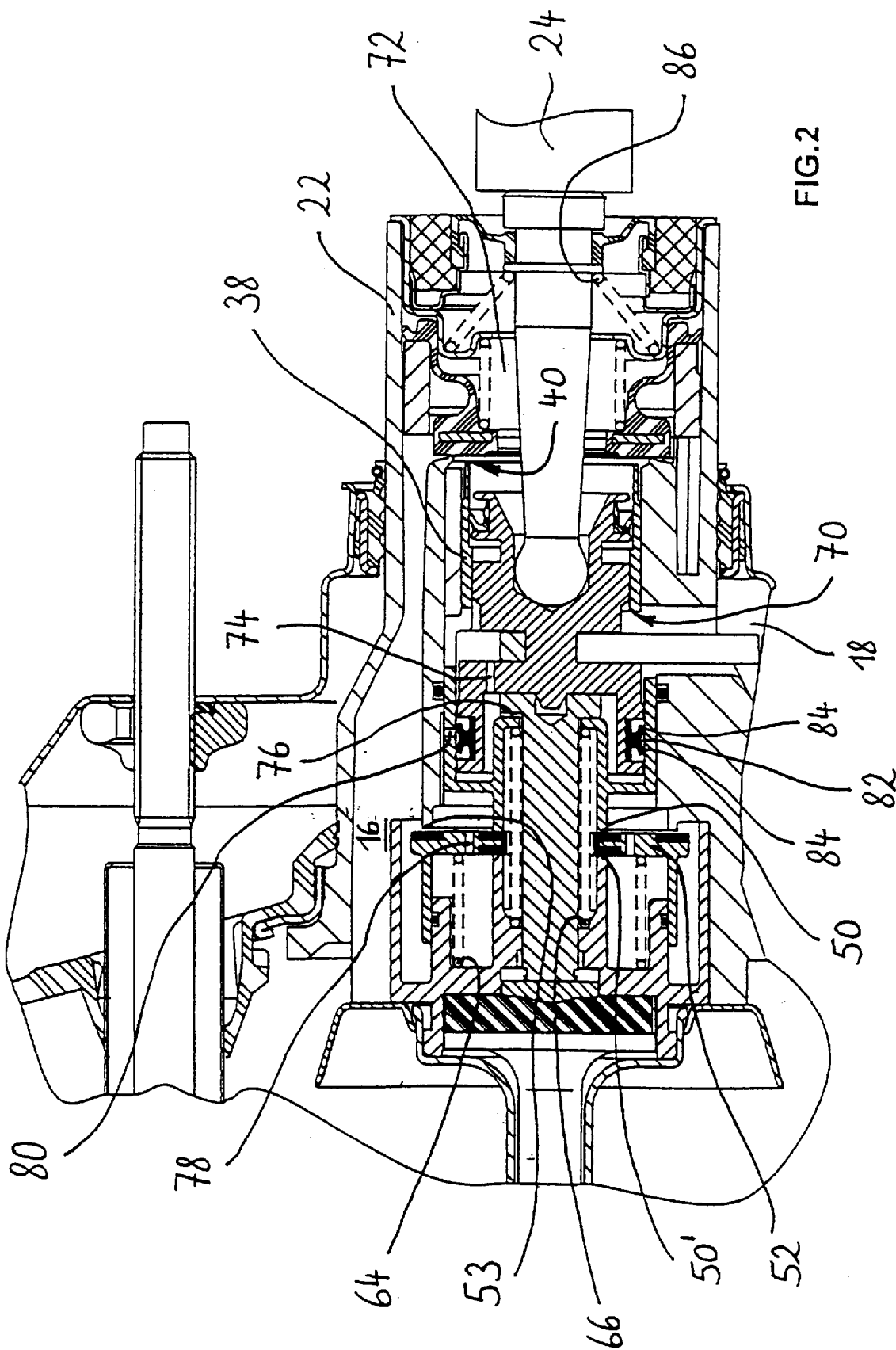
FIG. 2 is a view according to FIG. 1 in an actuating position, in which a brake assistant function is activated.
Figure 3:
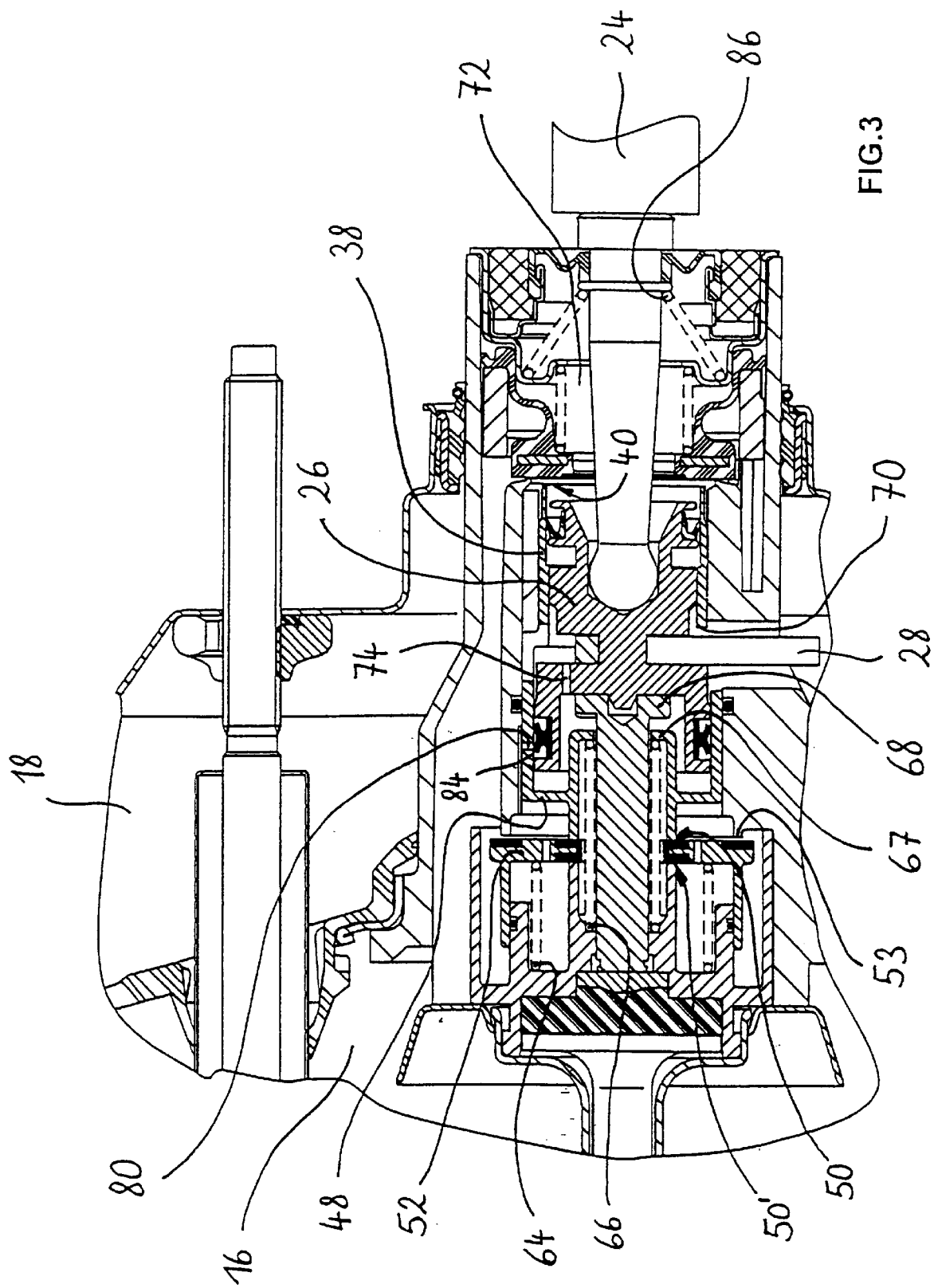
FIG. 3 is a view according to FIG. 2 with reduced actuating force.
Figure 4:
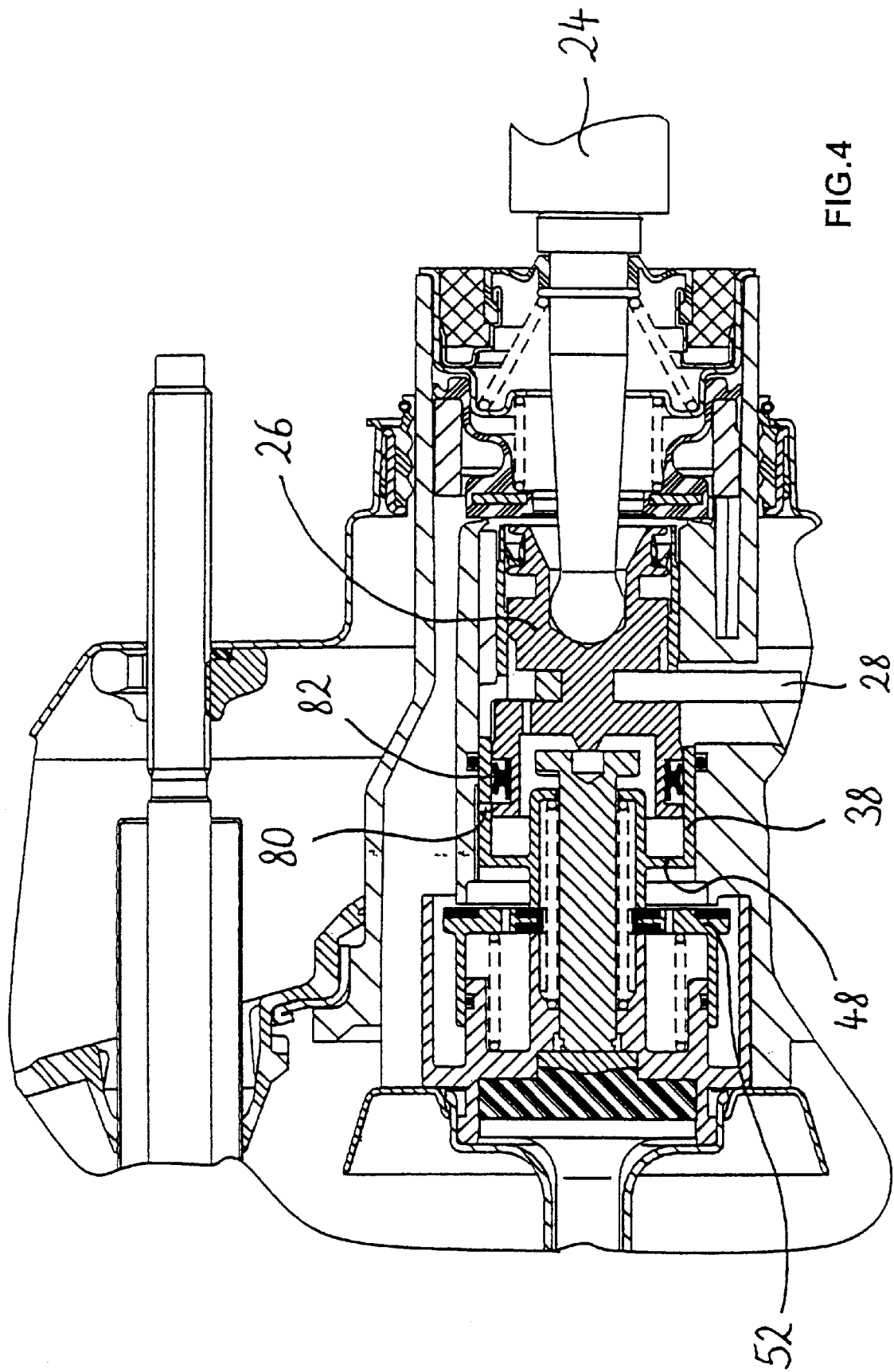
FIG. 4 is a view according to FIG. 1 and FIG. 2 just before the brake assistant function is disconnected.

FIG. 1 shows a vacuum brake booster 10 with a housing 12, the interior space of which is divided by a moveable wall 14 into a vacuum chamber 16 and a working chamber 18.

The vacuum chamber 16 is constantly connected to a vacuum source, for example to the intake tract of an internal combustion engine or to a vacuum pump, when the brake booster 10 is in operation. A control valve 20 with a housing 22 serves to establish a connection either between the vacuum chamber 16 and the working chamber 18, in order to evacuate the working chamber 18, or a connection between the evacuated working chamber 18 and the ambient atmosphere, i.e. the ambient pressure. The moveable wall 14 is coupled in a working manner to the control valve housing 22.

The brake booster 10 is actuated by means of a rod-shaped input member 24, which is resiliently biased into its initial position, projects along an axis A into the control valve housing 22 and is fastened by way of one, spherical end in a transmission piston 26.

A locking bar 28 is rigidly connected to the transmission piston 26, extends at a right angle to the axis A away from the transmission piston 26 and through a duct 30 formed in the control valve housing 22. In the position which is shown in FIG. 1 the locking bar 28 lies against a stop 32 of the brake booster housing 12 which defines the rest position of the control valve 20, i.e. the position of all the components of the control valve 20 relative to one another which they take up when the brake booster 10 is not actuated (LTF [lost travel free] position). The side walls of the duct 30 limit the mobility of the locking bar 28 along the axis A, i.e. the maximum travel of the locking bar 28 along the axis A is determined by the axial spacing of the side walls of the duct 30.

The end of the transmission piston 26 lying opposite the spherical end of the input member 24 lies against a force delivery ram 34, which transmits an actuating force introduced via the input member 24 into the brake booster 10 to a master cylinder, which is connected downstream of the brake booster, of a hydraulic vehicle brake system, only a part of an input piston 36 of which cylinder being reproduced in the figures.

The transmission piston 26 and a part of the force delivery ram 34 are surrounded by a displaceable valve member 38, which is disposed concentrically with them and is substantially sleeve-shaped. A first annular valve seat 40 of the control valve 20 is formed at the free end of the valve member 38, which is adjacent to the input member 24. The first valve seat 40 co-operates with a first valve sealing member 42, which is resiliently biased against it and is likewise annular, and can control the connection between the ambient atmosphere and the working chamber 18 of the brake booster 10.

A further annular valve seat 44 of the control valve 20 is formed inside the control valve housing 22 radially outside of the first valve seat 40 and concentrically with the latter, which valve seat 44 is called fourth valve seat in the following and likewise co-operates with the first valve sealing member 42. This fourth valve seat 44 can control the connection between the vacuum chamber 16 and the working chamber 18 of the brake booster 10 in order to evacuate the working chamber 18 again after the brake booster has been actuated.

A second annular valve seat 50 is formed at the free end of a sleeve 46, which has a smaller diameter than the valve member 38 and is connected in one piece to the valve member 38 via an annular flange 48, at the end of the displaceable valve member 38 which is remote from the input member 24, which valve seat 50 co-operates with a second valve sealing member 52, which is resiliently biased against it and is likewise annular.

A third valve seat 53, again annular, is formed at the control valve housing 22 radially outside of the second valve seat 50, which valve seat 53 is disposed concentrically with the latter and likewise co-operates with the second valve sealing member 52. The function of both the second valve seat 50 and of the third valve seat 53 shall be explained in detail in the following.

The second valve sealing member 52 is guided in an axially displaceable manner by means of a cylindrical prolongation 54, which extends from the member 52 in the direction of the input piston 36, on a correspondingly constructed section 56 of an auxiliary housing 58 and is sealed off from the section 56 by a seal 60. The auxiliary housing 58, which is inserted in the inner end region of the control valve housing 22 and firmly connected to the latter, comprises a hollow cylindrical prolongation 62, which projects into the control valve housing 22 and has a smaller outside diameter than the section 56, which is disposed concentrically with it and is likewise of a hollow cylindrical form. The end of the force delivery ram 34 which faces the input piston 36 is accommodated in the hollow cylindrical prolongation 62. An annular valve seat 50' is formed at the free end of the hollow cylindrical prolongation 62, which seat is of the same diameter as the second valve seat 50, with which it forms a functional unit in this embodiment. The valve seat 50' co-operates with the second valve sealing member 52 on the side of the latter which faces away from the second valve seat 50.

A compression spring 64 is disposed between the hollow cylindrical prolongation 62 and the section 56, this spring being supported on one side at the bottom of the auxiliary housing 58 and on the other, opposite side at the second valve sealing member 52. The compression spring 64 biases the second valve sealing member 52 opposite to the actuating direction of the brake booster 10 and in the direction of the second valve seat 50 and the third valve seat 53.

A further compression spring 66, which concentrically surrounds the force delivery ram 34 and is supported by way of one end at the auxiliary housing 58, presses with its other end against a circulating collar 67, which is directed radially inwards, of the sleeve 46 of the displaceable valve member 38, so that the valve member 38 is biased opposite to the actuating direction of the brake booster 10 and is normally held in contact with an annular collar 68 formed on the force delivery ram 34.

As represented in FIG. 1, the locking bar 28 projects through a recess 70 in the displaceable valve member 38. The locking bar 28 is located in the recess 70 with a clearance along the axis A which is smaller than the maximum possible travel of the locking bar 28 in the duct 30.

The function of the represented brake booster 10 is now explained in detail on the basis of FIGS. 1 to 4. Actuation of the brake booster 10 displaces the input member 24 into the brake booster 10 or into its control valve 20, i.e. to the left in the figures. This displacement of the input member 24 is transmitted to the transmission piston 26 and from the latter to the force delivery ram 34. The force delivery ram 34 in turn transmits this displacement to the displaceable valve member 38 by means of the annular collar 68 which is formed on it, so that the first valve seat 40 is lifted off the first valve sealing member 42, whereby ambient air can flow through a duct 72 surrounding the input member 24, past the open first valve seat 40 and further through the duct 30 into the working chamber 18 of the brake booster 10. A pressure difference is consequently produced at the moveable wall 14, and the resulting force is transmitted from the moveable wall 14 to the control valve housing 22, which delivers the force via the input piston 36 to the above-mentioned master cylinder.

Because the displaceable valve member 38 is coupled as described to the input member 24 in the actuating direction of the brake booster, the first valve seat 40 of the control valve 20 is opened to a greater or lesser degree in dependence upon the displacement of the input member 24 relative to the control valve housing 22. A corresponding assisting force of the brake booster 10 results from the pressure difference acting at the moveable wall 14 at the time.

Where conventional service braking, which here is called normal braking, is concerned, the input member 24 and therefore also the displaceable valve member 38 are only displaced over a relatively short distance in the actuating direction. As a result, although the second valve seat 50 is applied to the second valve sealing member 52 during normal braking of this kind, the valve seat 50' co-operating with it is not. There is no appreciable axial displacement of the second valve sealing member 52, so that the third valve seat 53 remains closed. When normal braking takes place the pressure prevailing in the working chamber 18 is therefore the same as that both at the rear side and at the front side of the annular flange 48 of the valve member 38 via an opening 74 (see FIG. 2) provided in the transmission piston 26, also via a duct 76 (see FIG. 2) formed at the annular collar 68 and via the valve seat 50', which is then open, and pressure equalising openings 78, which are provided in the second valve sealing member 52. Therefore no pressure difference is operative at the displaceable valve member 38 and, in particular, at its annular flange 48 during normal braking.

If an actuating force applied to the input member 26 during normal braking is not increased, the first valve sealing member 42 again comes into contact with the first valve seat 40 on account of the displacement of the control valve housing 22, which is brought about by the pressure difference present at the moveable wall 14, so that the air supply into the working chamber 18 is interrupted (position of equilibrium, both valve seats 40 and 44 closed).

If, however, the input member 24 is actuated rapidly and so that it travels relatively far, as is typical when panic braking (emergency braking), the displaceable valve member 38 is displaced relative to the control valve housing 22 in the actuating direction to an extent such that both the axial spacing between the second valve seat 50 and the second valve sealing member 52 and the axial spacing between the valve seat 50' and the second valve sealing member 52 are covered virtually instantaneously. Considering the process in greater detail, the second valve seat 50 is firstly applied in sealing fashion to the second valve sealing member 52 and then displaces the latter against the force of the compression spring 64 in the actuating direction, so that the valve seat 50' also comes into sealing contact with the second valve sealing member 52.

The displacement of the second valve sealing member 52 opens the third valve seat 53, so that the vacuum in the vacuum chamber 16 can enter an annular cavity B defined between the closed valve seats 50, 50' and the third valve seat 53. After the valve seat 53 has opened, the pressure in the annular cavity B reaches that of the vacuum chamber relatively quickly and then acts on the front side of the annular flange 48 of the valve member 38.

However the pressure prevailing in the working chamber 18 acts as before on the rear side of the annular flange 48. The pressure difference therefore applied to the annular flange 48 results in a force which acts on the displaceable valve member 38 in the actuating direction and which, through appropriately dimensioning the surface of the annular flange 48, is greater than the opposing force of the two compression springs 64 and 66. This ensures that the displaceable valve member 38 is held in the position reproduced in FIG. 2, i.e. the first valve seat 40 remains open (brake assistant function, see FIG. 2), even if the input member 24 is displaced slightly opposite to the actuating direction in the further course of the emergency braking action due to the high reactive forces then occurring (see FIG. 3). Because of the vacuum in the annular cavity B in this operating state, the displaceable valve member 38 remains "stuck by suction", as it were, to the second valve sealing member 52, even when the annular collar 68 comes away from the collar 67 of the sleeve 46 (see FIG. 3).

Pressure equalisation relative to the annular flange 48 must take place in order to disconnect the brake assistant function. A radial bore 80 is provided in the displaceable valve member 38 for this purpose, which bore is, an the one hand, constantly connected to the annular cavity B and can, on the other hand, be connected to the rear side of the annular flange 48. A ring seal 82, which is accommodated in the transmission piston 26 and comprises two axially spaced, circulating sealing lips 84, controls the connection to the interior space of the displaceable valve member 38 and thus to the rear side of the annular flange 48. As long as the radial bore 80 is located axially between the two sealing lips 84, the connection between the radial bore 80 and the interior space of the displaceable valve member 38 is interrupted. Only after the transmission piston 26 has been moved back relative to the valve member 30 to an extent such that the sealing lip 84 on the left-hand side in the figures has moved the radial bore 80 over opposite to the actuating direction of the brake booster is there a fluid connection between the interior space of the displaceable valve member 38 and the annular cavity B, so that the above-mentioned pressure equalisation can take place.

Once the pressure equalisation has been carried out, the force in the actuating direction resulting from the pressure difference at the annular flange 48 ceases, so that the compression spring 64 moves the second valve sealing member 52 into contact with the third valve seat 53, and the compression spring 66 presses the displaceable valve member 38 into contact with the annular collar 68 of the force delivery ram 34. The brake assistant function is thus disconnected and the valve seats 50 and 50' open again.

If the input member 24 moves back very quickly, the brake assistant function can also be disconnected in a second way. For a rapid return movement of the input member 24 causes the locking bar 28 to strike the edge of the recess 70 in the valve member 38 which is on the right-hand side in FIG. 3 (see FIG. 4), so that it is not just the force of the two compression springs 64 and 66 which acts on the displaceable valve member 38, but also the force of a compression spring 86 which biases the input member 24 opposite to the actuating direction. The combined force of these three compression springs 64, 66 and 68 is greater than the force resulting from the pressure difference at the annular flange 48 and acting in the actuating direction, so that the displaceable valve member 38 is forced away from the second valve sealing member 52 and the brake assistant function is disconnected, even if the pressure equalisation at the annular flange 48 has not yet taken place or not yet been completed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Vacuum brake booster with
   a vacuum chamber and a working chamber, which is separated in a pressure-tight manner from the latter by a moveable wall, and
   a control valve, which comprises a housing coupled in a working manner to the moveable wall and a first valve seat, which is disposed in the housing and which, in cooperation with a first valve sealing member, controls the supply of atmospheric pressure or above-atmospheric pressure to the working chamber in accordance with the displacement of an input member, which is coupled to the first valve seat, of the brake booster in order to obtain a pressure difference at the moveable wall, wherein the first valve seat is formed at a displaceable valve member, which is coupled to the input member in the actuating direction of the brake booster, wherein
      the valve member defines a rear side and a front side situated opposite the rear side, the rear side faces the input member and is exposed to the pressure prevailing in the working chamber, the front side is exposed to the pressure prevailing in the vacuum chamber when the displaceable valve member is displaced more than a predetermined distance in the actuating direction relative to the control valve housing, such that the differential pressure when acting on the displaceable valve member holds the valve member in a displaced position from the valve seat until pressure equalization between the front side and the rear side of the displaceable valve member is effected.

2. Vacuum brake booster according to claim 1, wherein the displaceable valve member is resiliently biased opposite to the actuating direction of the brake booster.

3. Vacuum brake booster according to claim 1, wherein a second valve seat is formed at the displaceable valve member, which seat co-operates with a second valve sealing member which in turn co-operates with a third valve seat which establishes a connection between the working chamber and the vacuum chamber in the open state, and that after the valve member has exceeded the prefixed displacement relative to the control valve housing, the second valve seat is closed and the third valve seat is open.

4. Vacuum brake booster according to claim 3, wherein an annular cavity is defined between the second valve seat and the third valve seat, the end boundary of which cavity is formed on one side by the displaceable valve member, and that the annular cavity is connected to the vacuum chamber when the second valve seat is closed and the third valve seat open and to the working chamber when the second valve seat is open and the third valve seat closed.

5. Vacuum brake booster according to claim 4, wherein the displaceable valve member comprises a duct which connects its front side to its rear side and which is open after the input member or a component coupled to the latter has exceeded a prefixed displacement relative to the displaceable valve member opposite to the actuating direction of the brake booster.

6. Vacuum brake booster according to claim 5, wherein the duct connecting the front side of the displaceable valve member to its rear side is selectively closed by means of a ring seal which comprises two axially spaced, circulating sealing lips and which is accommodated in a component which is guided in an axially displaceable manner relative to the displaceable valve member on or in the latter.

7. Vacuum brake booster according to claim 3,
wherein the second valve sealing member is resiliently biased opposite to the actuating direction of the brake booster and is selectively axially displaced against this spring bias.

8. Vacuum brake booster according to claim 3, wherein the displaceable valve member is substantially sleeve-shaped, wherein the first valve seat is formed at the end of the valve member which faces the input member and the second valve seat is formed at the opposite end of the valve member.

9. Vacuum brake booster according to claim 1, wherein the input member is resiliently biased opposite to the actuating direction.

* * * * *